United States Patent Office 3,547,939
Patented Dec. 15, 1970

3,547,939
IMIDAZO[1,2-c]THIAZOLES
Robert E. Manning, Mountain Lakes, N.J., assignor to Sandoz-Wander, Inc., Hanover, N.J., a corporation of Delaware
No Drawing. Filed May 3, 1968, Ser. No. 726,532
Int. Cl. C07d 99/06
U.S. Cl. 260—306.7      5 Claims

ABSTRACT OF THE DISCLOSURE

This disclosure pertains to 5-(2-aminoethylimino)-2,3-dihydro imidazo[1,2-c]thiazoles, e.g., 5-(2-aminoethylimino) - 7 - phenyl - 2,3 - dihydro-1H, 5H-imidazo[1,2-c]thiazole dihydrochloride. These compounds are useful as hypotensive agents.

---

This invention relates to novel heterocyclic compounds. More particularly, this invention pertains to 7-phenyl and 7 - substituted phenyl-5-(2-aminoethylimino)-2,3-dihydro imidazo[1,2-c]thiazoles, to acid addition salts thereof, and to methods for preparing these compounds. This invention also relates to certain intermediates useful in the preparation of said imidazo thiazoles and to processes for preparing the intermediates.

The imidazo thiazoles of the present invention may be represented by the following structural formula

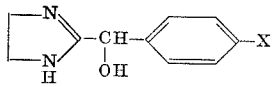

$\qquad$ (I)

wherein X represents H, halo having an atomic weight of about 19–36, or lower alkoxy, i.e., alkoxy groups having 1–4 carbon atoms, e.g., methoxy, ethoxy, isopropoxy and the like.

These novel compounds (I) may be prepared by treating in solvent an α-chlorobenzylimidazoline of the formula

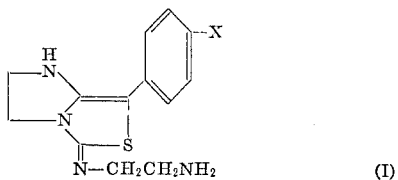

$\qquad$ (II)

where X is as defined above, or an acid addition salt thereof, with ethylenethiourea.

According to the above process, a compound illustrated by Formula II, preferably a strong mineral acid addition salt thereof, e.g. the hydrochloride, is treated in solvent with ethylenethiourea. Solvents which may be used include alcohols such as lower alkanols, e.g., methanol, ethanol, or isopropanol, acetone, and the like, or mixtures thereof. The reaction may be conducted at a temperature of about room temperature to about 100° C., preferably about 50° C. to about 80° C. Neither the particular solvent nor the temperature utilized is critical in obtaining the imidazo thiazoles of Formula I. The resulting products are recovered using conventional recovery techniques such as crystallization, and filtration.

The starting compounds (II) for the above process are prepared by chlorinating an α-hydroxybenzylimidazoline of the formula

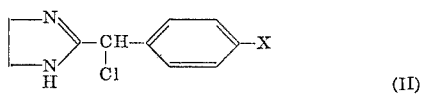

$\qquad$ III where X is as earlier defined, or an acid addition salt thereof, with thionyl chloride.

In accordance with the above process for preparing the compounds defined according to Formula II, the appropriate α-hydroxybenzylimidazoline of Formula III above is chlorinated with thionyl chloride, preferably in an inert solvent such as a chlorinated hydrocarbon, e.g., methylene or chloroform. The reaction may be conducted at a temperature of from about 0° C. to about 70° C., preferably about 30° C. to about 50° C., and is most conveniently conducted at the reflux temperature of the system. The particular reaction temperature and solvent are not critical in obtaining the compounds (II) and excess thionyl chloride may be used as solvent if desired. Certain of the α-hydroxybenzylimidazoline starting materials (III) are known and can be prepared according to methods described in the literature. The compounds of Formula III not specifically disclosed may be prepared according to analogous methods from known materials.

When the acid addition salt of either of compounds (I) or (II) is obtained and it is desired to secure the corresponding free base, such compound may be obtained using conventional methods, such as by dissolving the salt in solvent such as water and treating the resulting solution with a base such as sodium carbonate. If an acid addition salt other than the one obtained directly is desired, it may be obtained from the free base by salification.

The compounds of Formula I are useful because they possess pharmacological activity in animals. More particularly, the compounds are useful as hypotensive agents as indicated by the effect on dogs given 10–40 mg./kg. orally or active compound and tested by inducing renal hypertension in the hosts using a modification of the method of Goldblatt, et al.; J. Exp. Med., 59: 347 (1934). Using aseptic surgical techniques and pentobarbital anesthesia, the renal arteries are partially constricted bilaterally. Indirect blood pressures are recorded by use of a pneumatic pulse transducer with the sensor bound to the ventral surface of the tail.

Furthermore, the compounds (I) may be similarly administered in the form of their non-toxic pharmarceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

When so utilized, these compounds may be combined with a pharmaceutically acceptable carrier or adjuvant and may be orally administered. For this use, the dosage will vary depending upon frequency of administration and the particular compound employed. However, in general, satisfactory results are obtained when the compounds are administered at a daily dosage of from about 1–50 mg./kg. of animal body weight, preferably given in divided doses, e.g., 2–4 times a day, or in sustained release form. For most large animals, the total daily dosage is from about 70 to 500 mg. Dosage forms suitable for internal administration comprise from about 15 mg. to about 250 mg. of the active compound in admixture with a solid or liquid pharmaceutically acceptable carrier or diluent.

A representative formulation suitable for oral administration is a tablet prepared by standard tabletting techniques which contains the following.

| Ingredient: | Parts by weight |
| --- | --- |
| 5-(2-aminoethylimino) - 7 - p - chlorophenyl-2,3-dihydro-1H, 5H - imidazo[1,2-c]thiazole dihydrochloride | 10 |
| Tragacanth | 2 |
| Lactose | 79.5 |
| Corn starch | 5 |
| Talcum | 3 |
| Magnesium stearate | 0.5 |

EXAMPLE 1

5-(2-aminoethylimino)-7-phenyl-2,3-dihydro-1H, 5H-imidazo[1,2-c]thiazole dihydrochloride

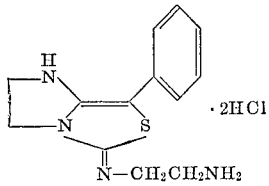

A mixture of 2-(α-hydroxybenzyl)-2-imidazoline hydrochloride (79 g.) in methylene chloride (1600 ml.) and thionyl chloride (47 g.) is heated under reflux for 24 hours. The reaction mixture is evaporated in vacuo. The resultant syrup is dissolved in 25 ml. methanol, and 180 ml. acetone, and 25 ml. ether is then added. The resultant solid is collected to give 61 g. of 2-(α-chlorobenzyl)-2-imidazoline hydrochloride; M.P. 165–171° C.

A mixture of 2-(α-chlorobenzyl)-2-imidazoline hydrochloride (11.5 g.), ethylenethiourea (5.1 g.) and ethanol (120 ml.) are heated under reflux for 15 hours. The resultant mixture is cooled and the crystals collected by filtration to give 8.5 g. of 5-(2-aminoethylimino)-7-phenyl-2,3-dihydro-1H, 5H-imidazo[1,2-c]thiazole dihydrochloride; M.P. 219–222° C. with decomposition.

EXAMPLE 2

5-(2-aminoethylimino)-7-p-chlorophenyl-2,3-dihydro-1H, 5H-imidazo[1,2-c]thiazole dihydrochloride

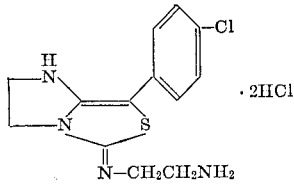

A mixture of 2-(p-chloro-α-hydroxybenzyl)-2-imidazoline hydrochloride (28 g.) in methylene chloride (560 ml.) and thionyl chloride (13.5 g.) is heated under reflux for one hour. The reaction mixture is evaported in vacuo and the residue is crystallized from ethanol (25 ml.) and ether (100 ml.) to give 21.8 g. of 2-(α,p-dichlorobenzyl)-2-imidazoline hydrochloride; M.P. 199–203° C. with decomposition.

A mixture of 2-(α-p-dichlorobenzyl)-2-imidazoline hydrochloride (10.8 g.), ethylenethiourea (4.0 g.) and ethanol (160 ml.) is heated under reflux for 15 hours. The reaction mixture is cooled and the crystals are collected by filtration to give 6.2 g. of 5-(2-aminoethylimino)-7-p-chlorophenyl-2,3-dihydro - 1H, 5H - imidazo[1,2-c]thiazole dihydrochloride; M.P. 225–228° C.

EXAMPLE 3

5-(2-aminoethylimino)-7-p-methoxyphenyl-2,3-dihydro-1H, 5H-imidazo[1,2-c]thiazole dihydrochloride

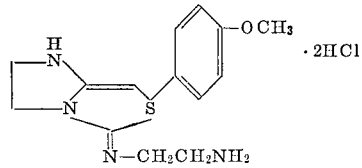

A mixture of 2-(α-hydroxy-p-methoxybenzyl)-2-imidazoline hydrochloride (35 g.) in methylene chloride (700 ml.) and thionyl chloride (18.9 g.) is heated under reflux for 2 hours. The resultant solid is collected by filtration to give 77 g. of 2-(α-chloro-p-methoxybenzyl)-2-imidazoline hydrochloride; M.P. 185–187° C.

A mixture of 2-(α-chloro-p-methoxybenzyl)-2-imidazoline hydrochloride (11.2 g.), ethylenethiourea (4.0 g.) and ethanol (160 ml.) is heated under reflux for 18 hours. The resultant mixture is cooled and the crystals collected by filtration to give 8.5 g. of 5-(2-aminoethylimino)-7-p-methoxyphenyl-2,3-dihydro-1H, 5H - imidazo[1,2-c]thiazole dihydrochloride; M.P. 216–222° C. with decomposition.

What is claimed is:

1. A compound of the formula

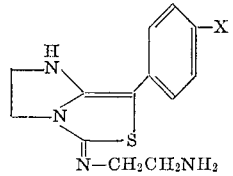

or a pharmaceutically acceptable acid addition salt thereof, where X represents H, halo having an atomic weight of about 19–36 or lower alkoxy.

2. The compound of claim 1 which is 5-(2-aminoethylimino)-7-phenyl-2,3-dihydro-1H, 5H-imidazo[1,2-c]thiazole dihydrochloride.

3. The compound of claim 1 which is 5-(2-aminoethylimino)-7-p-chlorophenyl-2,3-dihydro-1H, 5H-imidazo[1,2-c]thiazole dihydrochloride.

4. The compound of claim 1 in which 5-(2-aminoethylimino)-7-p-methoxyphenyl-2,3-dihydro-1H, 5H-imidazo[1,2-c]thiazole dihydrochloride.

5. A process for preparing a compound of claim 1 which comprises treating in solvent a compound of the formula

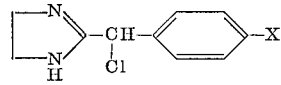

or its hydrochloric acid addition salt, with ethylenethiourea, where X represents H, halo having an atomic weight of about 19–36 or lower alkoxy.

References Cited

UNITED STATES PATENTS 3,206,469   9/1965   Pifferi   260—306.7

ALEX MAZEL, Primary Examiner

R. J. GALLAGHER, Assistant Examiner

U.S. Cl. X.R.

260—309.6; 424—200,270